United States Patent
Gwak et al.

(10) Patent No.: US 9,282,470 B2
(45) Date of Patent: Mar. 8, 2016

(54) METHOD AND APPARATUS FOR DETECTING RADIO LINK FAILURE IN WIRELESS COMMUNICATION SYSTEM

(75) Inventors: Cheol Gwak, Anyang-si (KR); Jin Sook Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 13/825,277

(22) PCT Filed: Nov. 29, 2010

(86) PCT No.: PCT/KR2010/008475
§ 371 (c)(1),
(2), (4) Date: Mar. 20, 2013

(87) PCT Pub. No.: WO2012/057398
PCT Pub. Date: May 3, 2012

(65) Prior Publication Data
US 2013/0176862 A1    Jul. 11, 2013

(30) Foreign Application Priority Data
Oct. 28, 2010    (KR) .......................... 10-2010-0105786

(51) Int. Cl.
*H04W 24/00* (2009.01)
*H04L 1/20* (2006.01)
*H04L 1/24* (2006.01)
*H04L 1/00* (2006.01)

(52) U.S. Cl.
CPC ................ *H04W 24/00* (2013.01); *H04L 1/20* (2013.01); *H04L 1/245* (2013.01); *H04L 1/0045* (2013.01)

(58) Field of Classification Search
CPC ....... H04L 1/0045; H04L 1/0046; H04L 1/20; H04L 1/245; H04L 1/247; H04W 24/00–24/10
See application file for complete search history.

(56) References Cited

U.S. PATENT DOCUMENTS

| | | | |
|---|---|---|---|
| 2004/0185855 A1* | 9/2004 | Storm et al. | 455/445 |
| 2008/0074994 A1 | 3/2008 | Jen | |
| 2008/0076404 A1 | 3/2008 | Jen | |
| 2010/0067440 A1 | 3/2010 | Dick et al. | |
| 2010/0113008 A1* | 5/2010 | Wang | H04L 1/20 455/423 |
| 2010/0330920 A1* | 12/2010 | Koskela | H04L 1/1854 455/67.11 |

FOREIGN PATENT DOCUMENTS

WO    WO 2009-057074    5/2009

* cited by examiner

*Primary Examiner* — Xavier S Wong
(74) *Attorney, Agent, or Firm* — Dentons US LLP

(57) ABSTRACT

A method and apparatus of detecting a radio link failure in a wireless communication system is provided. A mobile station initializes a radio link failure (RLF) counter for detecting the radio link failure and determines whether decoding of a message on a downlink channel is successful. The mobile station decrements a value of the RLF counter if the decoding fails, and increments the value of the RLF counter if the decoding is successful, and declaring the radio link failure if the value of the RLF counter is less than or equal to a specific value. A decrement size of the value of the RLF counter varies according to a received signal strength of the downlink channel.

10 Claims, 3 Drawing Sheets

METHOD AND APPARATUS FOR DETECTING RADIO LINK FAILURE IN WIRELESS COMMUNICATION SYSTEM

This Application is a 35 U.S.C. §371 National Stage Entry of International Application No. PCT/KR2010/008475, filed Nov. 29, 2010 and claims the benefit of Korean Application No: 10-2010-0105786, filed Oct. 28, 2010, all of which are incorporated by reference in their entirety herein.

TECHNICAL FIELD

The present invention relates to wireless communications, and more particularly, to a method and apparatus for detecting a radio link failure in a wireless communication system.

BACKGROUND ART

A global system for mobile communication (GSM) is one of wireless technologies which have been developed to accommodate a large number of subscribers ever since it was created as one of means for unifying wireless communication mechanisms in the European region. A general packet radio service (GPRS) is introduced to provide a packet-switched data service in a circuit-switched data service provided in the GSM. An enhanced data rate for GSM evolution (EDGE) provides a higher data capacity by using an additional modulation scheme in the GPRS.

In a wireless communication system, a mobile station communicates with a base station. When a link between the base station and the mobile station is disconnected, this is called a radio link failure. The purpose of determining the radio link failure by the mobile station is to re-establish or release a cell with unacceptable voice/data quality.

According to the section 5.2 of 3GPP TS 45.008 V7.9.0 (2007-08) "Technical Specification Group GSM/EDGE Radio Access Network; Radio subsystem link control (Release 7)", a criterion for determining the radio link failure in the mobile station shall be based on a decoding success rate of messages on a downlink slow associated control channel (SACCH).

A traffic channel (TCH) is used for transmission of voice or circuit switched data. Signaling related to the TCH is transmitted on the SACCH or a fast associated control channel (FACCH).

In the conventional GSM/GPRS system, a coding rate of the SACCH is higher than a coding rate of the TCH. Sensitivity to a channel state increases in proportion to the coding rate. Therefore, if the decoding of the message on the SACCH fails, a decoding failure rate of the TCH is high.

However, as an adaptive multi-rate (AMR) audio codec is applied, the coding rate of the TCH becomes variable, and there is a case where the coding rate of the SACCH becomes lower than the coding rate of the TCH. This implies that the decoding of the SACCH fails but a decoding success rate of the TCH increases.

In this state, when the radio link failure is determined only based on a decoding success rate of the SACCH, there may be a problem in which the radio link failure is detected even if voice/data service can normally be provided.

DISCLOSURE OF INVENTION

Technical Problem

The present invention provides a method and apparatus for detecting a radio link failure in a wireless communication system.

Solution to Problem

In an aspect, a method of detecting a radio link failure in a wireless communication system is provided. The method includes initializing a radio link failure (RLF) counter for detecting the radio link failure, determining whether decoding of a message on a downlink channel is successful, decrementing a value of the RLF counter if the decoding fails, and incrementing the value of the RLF counter if the decoding is successful, and declaring the radio link failure if the value of the RLF counter is less than or equal to a specific value, wherein a decrement size of the value of the RLF counter varies according to a received signal strength of the downlink channel.

A decrement size of the RLF counter may be decreased in inverse proportion to the received signal strength of the downlink channel.

An increment size of the RLF counter may vary according to the received signal strength of the downlink channel.

The increment size of the RLF counter may be increased in inverse proportion to the received signal strength of the downlink channel.

In another aspect, a mobile station for detecting a radio link failure in a wireless communication system is provided. The mobile station includes a radio frequency (RF) unit for receiving a radio signal, and a processor coupled to the RF unit and configured for initializing a radio link failure (RLF) counter for detecting the radio link failure, determining whether decoding of a message on a downlink channel is successful, decrementing a value of the RLF counter if the decoding fails, and incrementing the value of the RLF counter if the decoding is successful, and declaring the radio link failure if the value of the RLF counter is less than or equal to a specific value, wherein a decrement size of the value of the RLF counter varies according to a received signal strength of the downlink channel.

Advantageous Effects of Invention

A radio link failure can be detected by considering various channel conditions. Unnecessary declaration of the radio link failure can be avoided. A network can further effectively manage a radio link. A mobile station can decrease a service delay caused by the radio link failure.

MODE FOR THE INVENTION

A mobile station (MS) may be fixed or mobile, and may be referred to as another terminology, such as a user equipment (UE), a user terminal (UT), a user terminal (UT), a subscriber station (SS), a wireless device, a personal digital assistant (PDA), a wireless modem, a handheld device, etc.

A base station (BS) is generally a fixed station that communicates with the MS and may be referred to as another terminology, such as an evolved node-B (eNB), a base transceiver system (BTS), an access point, etc.

A network described hereinafter is based on a GSM/EDGE radio access network (GERAN) for example. However, the present invention is not limited thereto, and thus the network may be based on various schemes such as a UMTS terrestrial radio access network (UTRAN), an evolved-UTRAN (E-UTRAN), etc.

Figure 1:
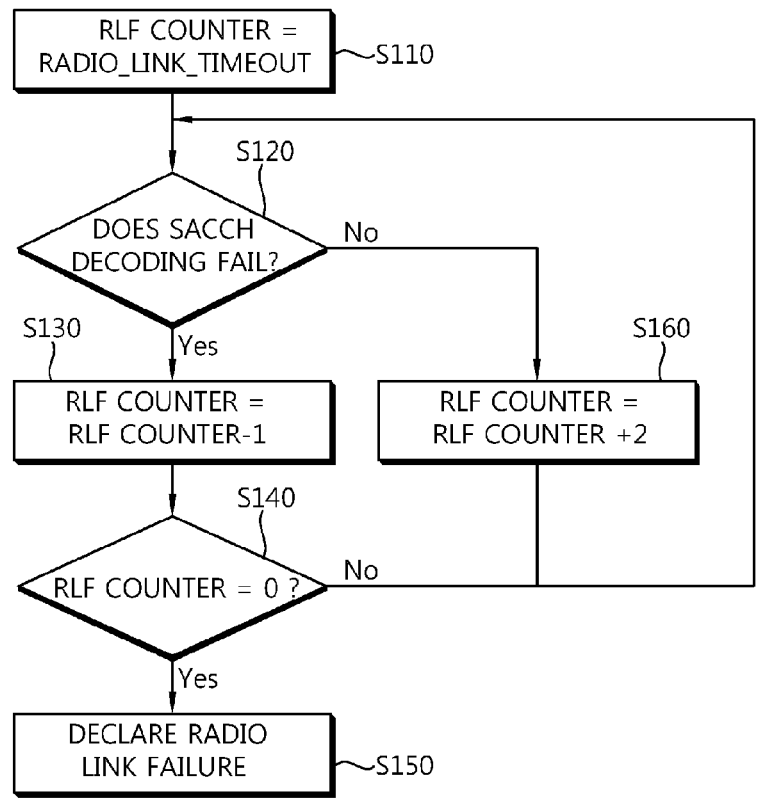
FIG. 1 is a flowchart showing a radio link failure according to the prior art.

FIG. 1 is a flowchart showing a radio link failure according to the prior art. The section 5.2 of 3GPP TS 45.008 V7.9.0 (2007-08) may be incorporated herein by reference.

When a dedicated channel is allocated or initialized, an MS initializes a radio link failure (RLF) counter to a value 'RADIO_LINK_TIMEOUT' (step S110). A BS may transmit the value RADIO_LINK_TIMEOUT to the MS through a previously used channel or a slow associated control channel (SACCH).

The MS determines whether a message on the SACCH is successfully decoded (step S120).

If the SACCH message cannot be decoded, the MS decrements the RLF counter by 1 (step S130). If the RLF counter is 0 (step S140), the radio link failure is declared (step S150).

If the SACCH message is successfully decoded, the MS increments the RLF counter by 2 (step S160). In this case, a value of the RLF counter does not exceed the value RADIO_LINK_TIMEOUT.

As described above, the MS determines the radio link failure on the basis of a decoding success rate of the message on the downlink SACCH.

In the conventional GSM/GPRS system, a coding rate of the SACCH is higher than a coding rate of a traffic channel (TCH). Sensitivity to a channel state increases in proportion to the coding rate. Therefore, if decoding of the message on the SACCH fails, a decoding failure rate of the TCH is high.

However, as an adaptive multi-rate (AMR) audio codec is applied, the coding rate of the TCH becomes variable, and there is a case where the coding rate of the SACCH becomes lower than the coding rate of the TCH. This implies that the decoding of the SACCH fails but a decoding success rate of the TCH increases.

In this state, when the radio link failure is determined only based on a decoding success rate of the SACCH, there may be a problem in which the radio link failure is detected even if a normal voice/data service is possible.

Figure 2:
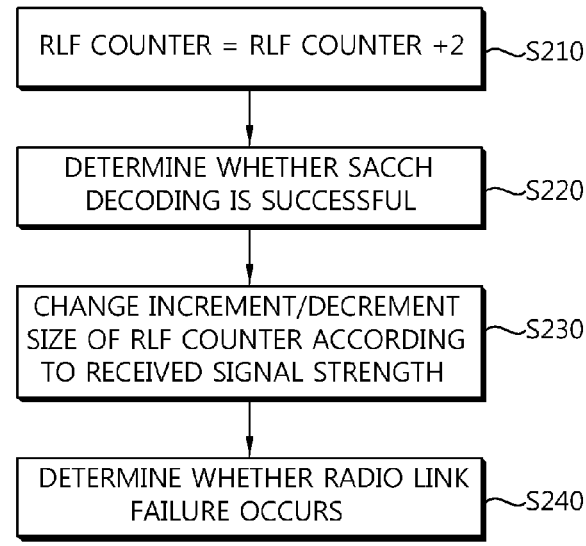
FIG. 2 is a flowchart showing a method of detecting a radio link failure according to an embodiment of the present invention.

FIG. 2 is a flowchart showing a method of detecting a radio link failure according to an embodiment of the present invention. This process may be performed by an MS.

The MS initializes an RLF counter for detecting the radio link failure (step S210). The RLF counter may be initialized to a value 'RADIO_LINK_TIMEOUT'. A BS may transmit the value RADIO_LINK_TIMEOUT to the MS through a previously used channel or an SACCH.

The MS determines whether a message on the SACCH, which is a downlink channel, is successfully decoded (step S220).

If the decoding fails, a value of the RLF counter is decremented, and if the decoding succeeds, the value of the RLF counter is incremented. The value of the RLF counter does not exceed the value RADIO_LINK_TIMEOUT. In this case, the MS changes an increment and/or decrement size of the RLF counter according to a received signal strength of the SACCH (step S230).

The MS declares the radio link failure if the value of the RLF counter is less than or equal to a specific value (step S240).

The reason of changing the increment and/or decrement size of the value of the RLF counter according to the received signal strength of the SACCH is to consider the received signal strength in the detection of the radio link failure.

Figure 3:
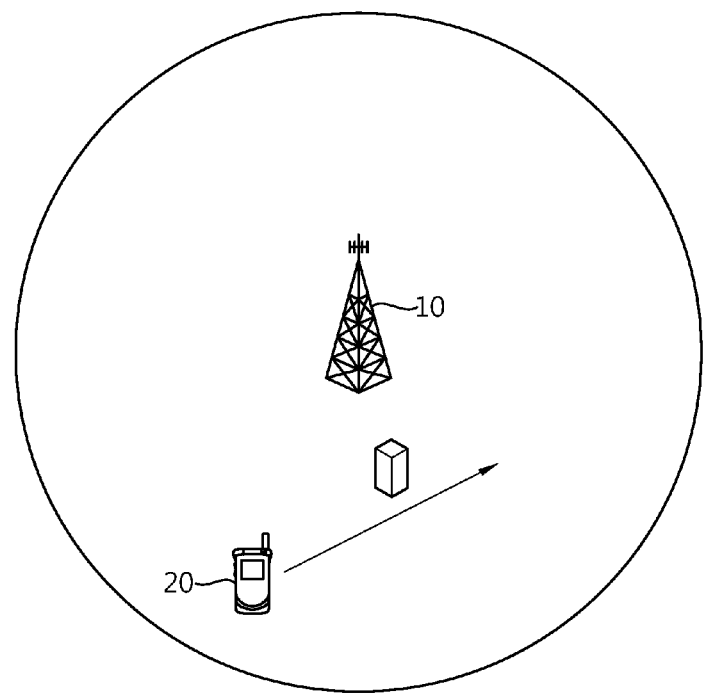
FIG. 3 shows a situation where a mobile station moves in a cell center.

FIG. 3 shows a situation where an MS moves in a cell center. An MS 20 is located near the cell center, and thus it can be regarded that its received signal strength is strong since a distance to a BS 10 is short.

Assume that the MS 20 passes behind a big building. In this case, a channel between the MS 20 and the BS 10 may temporarily deteriorate due to interference, and thus SACCH decoding may fail. However, the received signal strength is relatively great. Therefore, when the received signal strength is relatively great even if an error occurs in the SACCH decoding, detection of the radio link failure is delayed by delaying the decrease of an RLF counter or by resetting the RLF counter.

Accordingly, if the received signal strength of the SACCH is greater than a first threshold, the detection of the radio link failure may be delayed by resetting the RLF counter.

Alternatively, the detection of the radio link failure may be delayed by decreasing a decrement size of the RLF counter in inverse proportion to the received signal strength of the SACCH.

Figure 4:
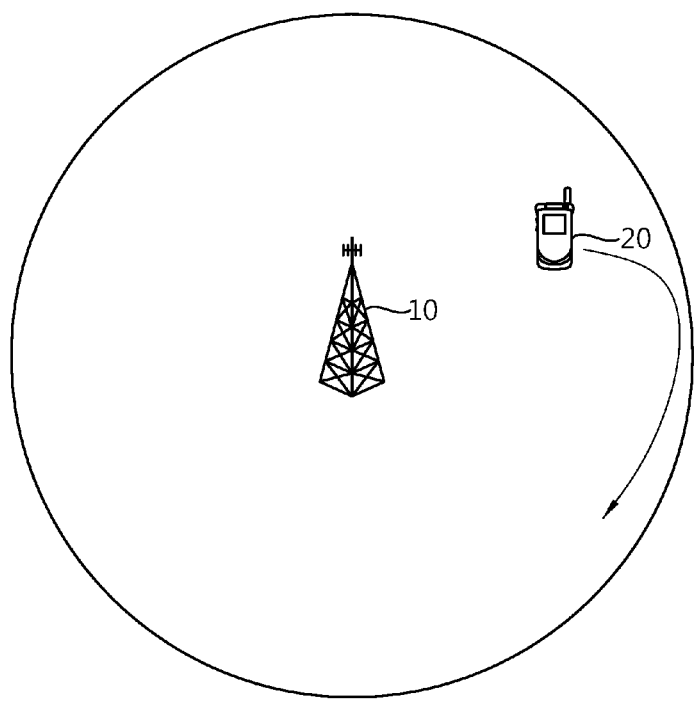
FIG. 4 shows a situation in which a mobile station moves in a cell edge.

FIG. 4 shows a situation in which an MS moves in a cell edge. An MS 20 is located near the cell edge, and thus it can be regarded that its received signal strength is weak since a distance to a BS 10 is relatively long.

Assume that the MS 20 turns around the cell edge. In this case, if a radio link failure is declared only based on an SACCH decoding error similarly to the conventional method, the MS 20 is handed over to another cell or performs cell reselection. However, since the MS 20 turns the cell edge, it is more effective to stay in the existing cell. Therefore, if the SACCH decoding error does not occur and a received signal strength is small, an RLF counter is incremented by a large value, thereby delaying detection of the radio link failure.

The detection of the radio link failure may be delayed by increasing a decrement size of the RLF counter in inverse proportion to the received signal strength of the SACCH.

Figure 5:
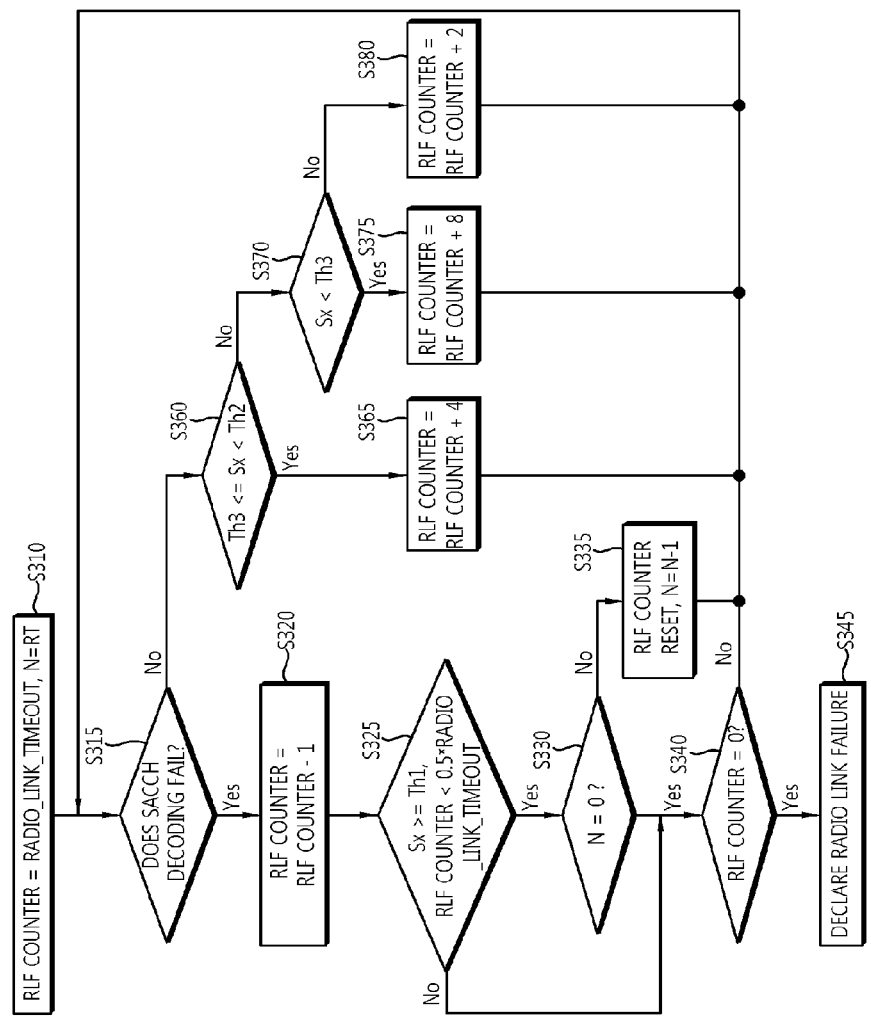
FIG. 5 is a flowchart showing a method of detecting a radio link failure according to an embodiment of the present invention.

FIG. 5 is a flowchart showing a method of detecting a radio link failure according to an embodiment of the present invention. This process describes a detailed example of the embodiment of FIG. 3.

An MS initializes an RLF counter to a value RADIO_LINK_TIMEOUT, and initializes a reset counter value N to RT (step S310). The RT denotes a parameter indicating how many times the RLF counter is reset repetitively.

It is determined whether SACCH decoding fails (step S315).

When the SACCH decoding fails, the RLF counter is decremented by 1 (step S320).

If a received signal strength Sx is greater than a first threshold Th1 and if a value of the RLF counter is less than a half of RADIO_LINK_TIMEOUT (step S325), it is determined whether N is equal to 0 (step S330). If N is 0, the RLF counter is reset, and N is decremented by 1 (step S335). The resetting of the RLF counter is an act of initializing the RLF counter to the value RADIO_LINK_TIMEOUT. If N is 0, step S340 is performed.

When the SACCH decoding fails, the first threshold Th1 is a threshold of an upper received signal strength for delaying the RLF counter.

If the condition of step S325 is not satisfied, it is determined whether the value of the RLF counter is 0 (step S340). If the value of the RLF counter is 0, the radio link failure is declared (step S345).

Even if the SACCH decoding fails, if the received signal strength is greater than or equal to the first threshold T1, declaration of the radio link failure is delayed by a specific time by resetting the RLF counter.

If the SACCH decoding succeeds in step S315, it is determined whether the received signal strength Sx is between a third threshold Th3 and a second threshold Th2 (step S360). If the received signal strength Sx is between the two thresholds Th3 and Th2, the RLF counter is incremented by 4 (step S365).

It is determined whether the received signal strength Sx is less than the third threshold Th3 (step S370). If the received signal strength Sx is less than the third threshold Th3, the RLF counter is incremented by 8 (step S375).

If the received signal strength Sx is greater than the second threshold Th2, the RLF counter is incremented by 2 (step S380).

The second threshold Th2 and the third threshold Th3 are thresholds of a lower received signal strength for delaying the RLF counter.

Even if the RLF counter is incremented, the value of the RLF counter does not exceed the value RADIO_LINK_TIMEOUT.

If the SACCH decoding succeeds, declaration of the radio link failure is delayed by a specific time by increasing an increment size of the RLF counter in inverse proportion to the received signal strength.

Figure 6:
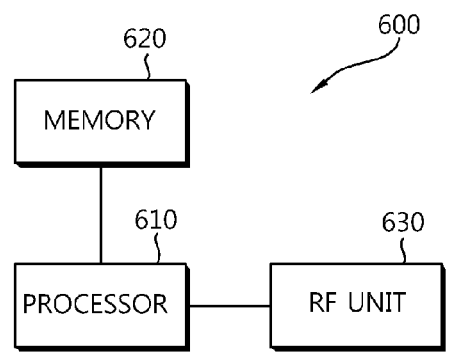
FIG. 6 is a block diagram showing a mobile station for implementing an embodiment of the present invention.

FIG. 6 is a block diagram showing an MS for implementing an embodiment of the present invention.

An MS 600 includes a processor 610, a memory 620, and a radio frequency (RF) unit 630. The memory 620 is coupled to the processor 610, and stores a variety of information for driving the processor 610. The RF unit 630 is coupled to the processor 610, and transmits and/or receives a radio signal.

The processor 610 implements the function of the MS according to the embodiments of FIG. 2 and FIG. 5. The processor 610 detects a radio link failure. Upon detection of the radio link failure, the processor 610 declares the radio link failure, and performs a necessary function such as handover, cell reselection, etc.

A processor may include application-specific integrated circuit (ASIC), other chipset, logic circuit and/or data processing device. A memory may include read-only memory (ROM), random access memory (RAM), flash memory, memory card, storage medium and/or other storage device. A RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of detecting a radio link failure in a wireless communication system, the method comprising:
    initializing a radio link failure (RLF) counter for detecting the radio link failure;
    determining whether decoding of a message on a downlink channel is successful;
    decrementing a value of the RLF counter if the decoding fails, and incrementing the value of the RLF counter if the decoding is successful; and
    declaring the radio link failure if the value of the RLF counter is less than or equal to a specific value,
    wherein a decrement size of the value of the RLF counter varies according to a received signal strength of the downlink channel,
    wherein if the received signal strength of the downlink channel is greater than a first threshold and if a reset counter is less than a specific value, the RLF counter is reset,
    wherein a value of the reset counter is decremented when the RLF counter is reset,
    wherein if the decoding is successful and if the received signal strength of the downlink channel is less than a second threshold and greater than or equal to a third threshold, the RLF counter is incremented by 4, the second threshold being greater than the third threshold,
    wherein if the decoding is successful and if the received signal strength of the downlink channel is less than the third threshold, the RLF counter is incremented by 8, and
    wherein if the decoding is successful and if the received signal strength of the downlink channel is greater than or equal to the second threshold, the RLF counter is incremented by 2.

2. The method of claim 1, wherein a decrement size of the RLF counter is decreased in inverse proportion to the received signal strength of the downlink channel.

3. The method of claim 1, wherein an increment size of the RLF counter varies according to the received signal strength of the downlink channel.

4. The method of claim 3, wherein the increment size of the RLF counter is increased in inverse proportion to the received signal strength of the downlink channel.

5. The method of claim 1, wherein the downlink channel is a slow associated control channel (SACCH).

6. A mobile station for detecting a radio link failure in a wireless communication system, comprising:
    a radio frequency (RF) unit for receiving a radio signal; and
    a processor coupled to the RF unit and configured for:
        initializing a radio link failure (RLF) counter for detecting the radio link failure;
        determining whether decoding of a message on a downlink channel is successful;
        decrementing a value of the RLF counter if the decoding fails, and incrementing the value of the RLF counter if the decoding is successful; and
        declaring the radio link failure if the value of the RLF counter is less than or equal to a specific value, wherein a decrement size of the value of the RLF counter varies according to a received signal strength of the downlink channel, wherein if the received signal strength of the downlink channel is greater than a first threshold and if a reset counter is less than a specific value, the RLF counter is reset, wherein a value of the reset counter is decremented when the RLF counter is reset, wherein if the decoding is successful and if the received signal strength of the downlink channel is less than a second threshold and greater than or equal to a third threshold, the RLF counter is incremented by 4, the second threshold being greater than the third threshold, wherein if the decoding is successful and if the received signal strength of the downlink channel is less than the third threshold, the RLF counter is incremented by 8, and wherein if the decoding is successful and if the received signal strength of the downlink channel is greater than or equal to the second threshold, the RLF counter is incremented by 2.

7. The mobile station of claim 6, wherein a decrement size of the RLF counter is decreased in inverse proportion to the received signal strength of the downlink channel.

8. The mobile station of claim 6, wherein an increment size of the RLF counter varies according to the received signal strength of the downlink channel.

9. The mobile station of claim 8, wherein the increment size of the RLF counter is increased in inverse proportion to the received signal strength of the downlink channel.

10. The mobile station of claim 6, wherein the downlink channel is a slow associated control channel (SACCH).

* * * * *